United States Patent [19]
Bornhorst et al.

[11] Patent Number: 6,006,660
[45] Date of Patent: Dec. 28, 1999

[54] SEGMENTED DRIVE DISK FOR A MECHANICAL PRESS

[75] Inventors: Don Bornhorst, Minster; Kurt A. Bohman, Versailles; Bradley A. Burns, Wapakoneta; Ed Daniel, Fort Loramie; Kevin Evers, Fort Recovery; Bryan Pax, Minster; Robert L. Schockman, St. Henry, all of Ohio

[73] Assignee: The Minster Machine Company, Minster, Ohio

[21] Appl. No.: 09/133,086

[22] Filed: Aug. 12, 1998

[51] Int. Cl.⁶ ........................................ B30B 15/12
[52] U.S. Cl. .................... 100/282; 192/70.14; 192/70.17
[58] Field of Search ..................... 100/280, 282, 100/292; 192/70.12, 70.13, 70.14, 70.17, 70.18, 12 C, 18 A

[56] References Cited

U.S. PATENT DOCUMENTS

| | | | |
|---|---|---|---|
| 1,656,778 | 1/1928 | Desroziers | 192/70.14 |
| 2,172,503 | 9/1939 | Fies | 192/70.14 |
| 2,217,529 | 10/1940 | Spase . | |
| 2,303,201 | 11/1942 | Eason | 192/70.14 |
| 2,567,168 | 9/1951 | Goodchild . | |
| 2,667,248 | 1/1954 | Wissman | 100/282 |
| 2,674,356 | 4/1954 | Eason | 192/18 A |
| 2,942,708 | 6/1960 | Eason | 192/18 A |
| 3,111,054 | 11/1963 | Tishken . | |
| 3,611,918 | 10/1971 | Marsh et al. . | |
| 4,013,147 | 3/1977 | Anderson | 192/70.14 |
| 4,095,523 | 6/1978 | Drungil . | |
| 4,446,785 | 5/1984 | Tack, Jr. | 100/282 |
| 4,566,573 | 1/1986 | Lane, Jr. . | |
| 4,863,000 | 9/1989 | Patel | 192/18 A |
| 5,370,045 | 12/1994 | Burns . | |
| 5,564,333 | 10/1996 | Palmer . | |

*Primary Examiner*—Stephen F. Gerrity
*Attorney, Agent, or Firm*—Randall J. Knuth

[57] ABSTRACT

A drive disk assembly for use in a press machine is segmented into a plurality of discrete drive disk segments each having a friction pad attached thereto. The segmented drive disk permits individual disk segments and friction pads to be removed after installation without disassembling the entire arrangement. The disk segments may grow thermally without causing the flex disk being utilized to shift axially or radially. A slot formed throughout the disk segment acts as an effective heat barrier to protect sensitive parts from undue thermal exposure.

16 Claims, 4 Drawing Sheets

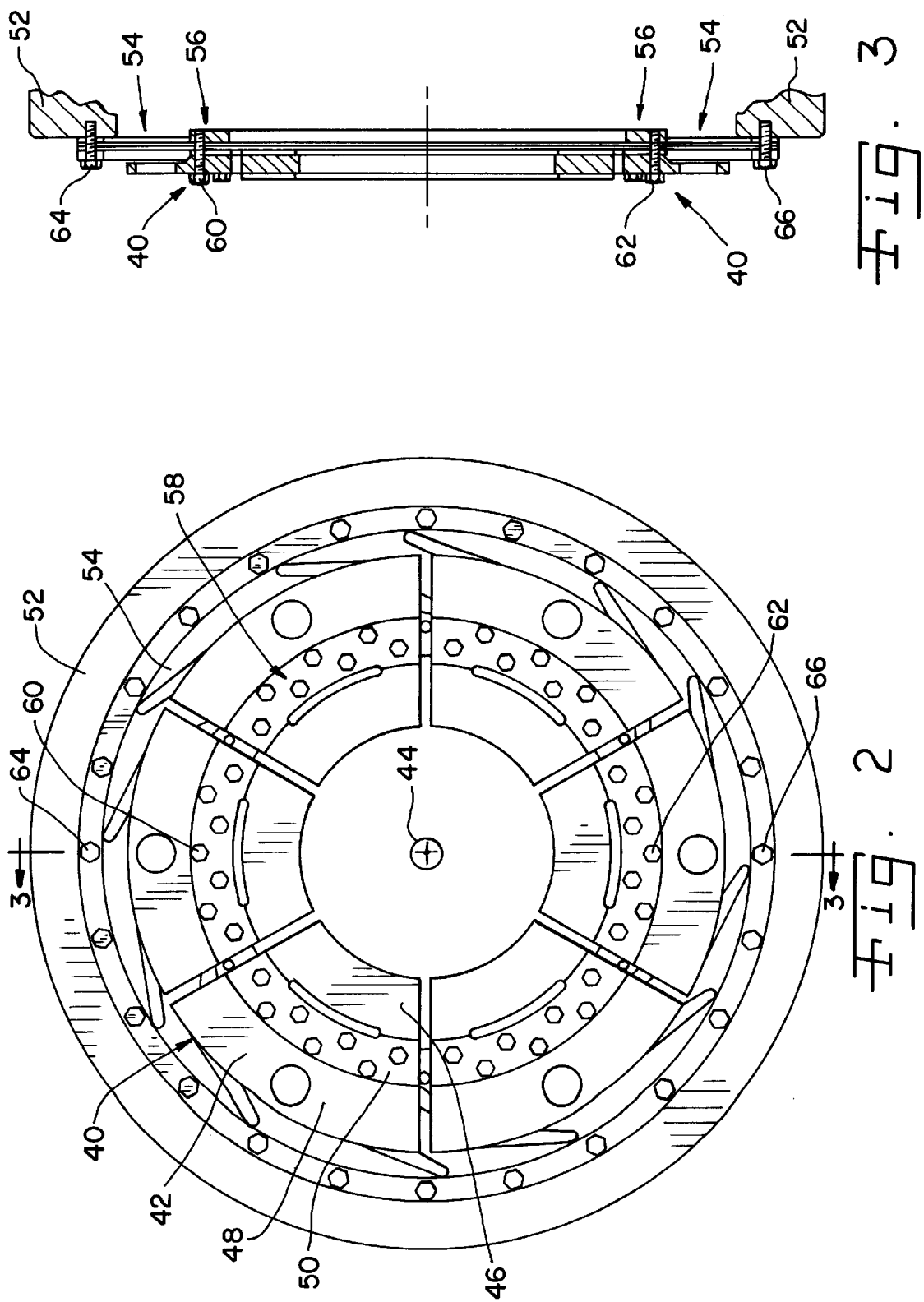

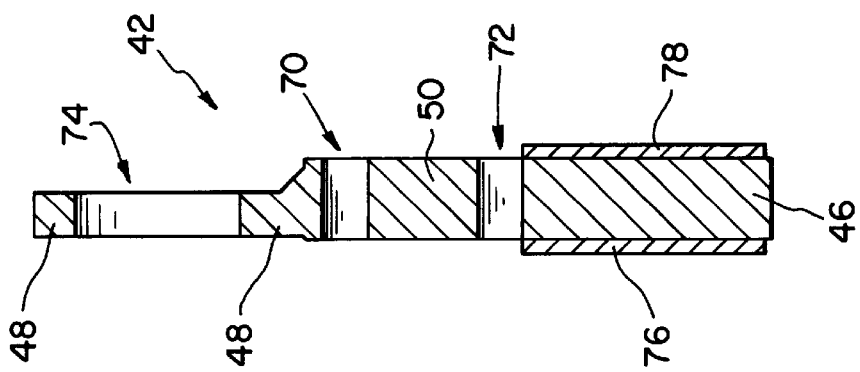
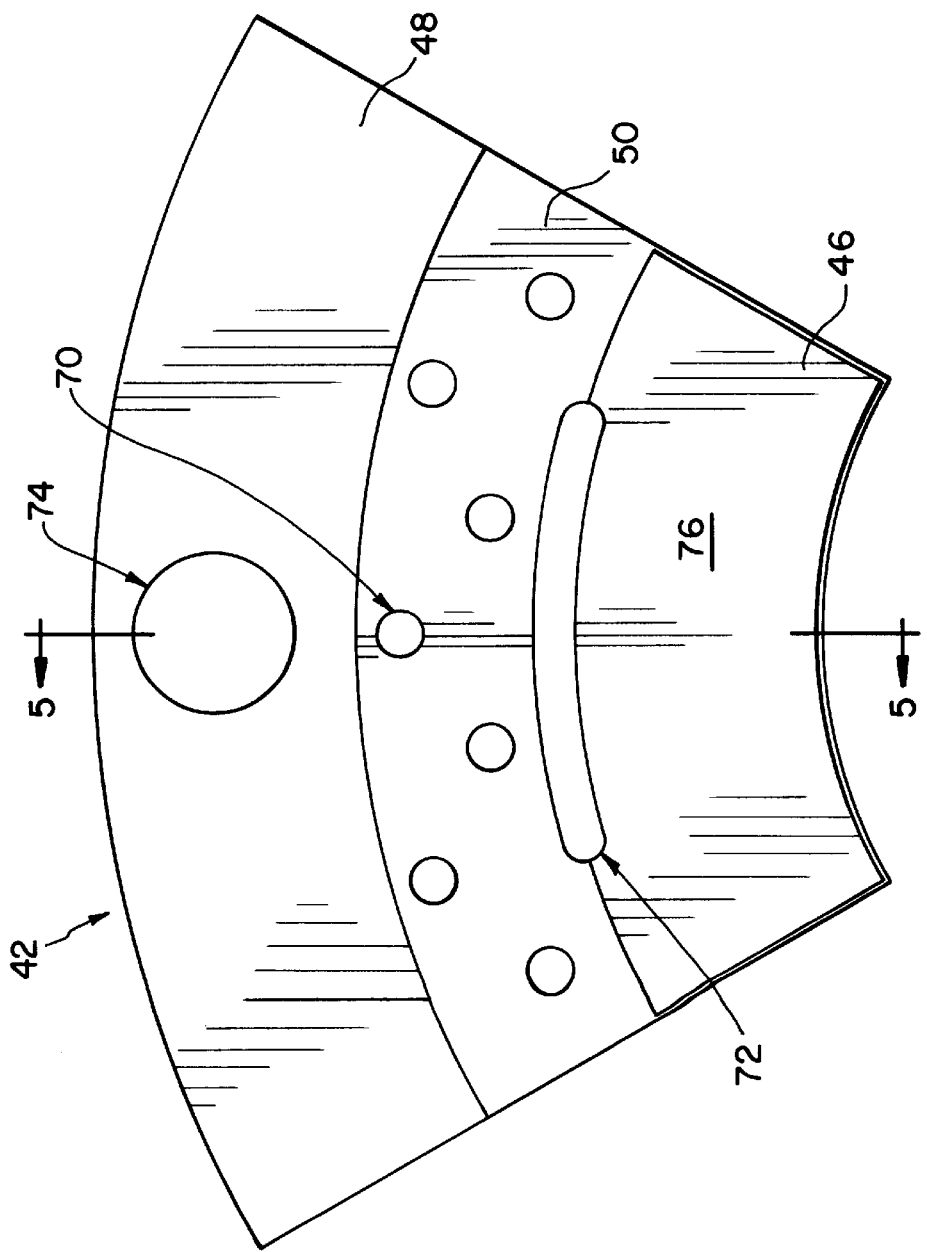

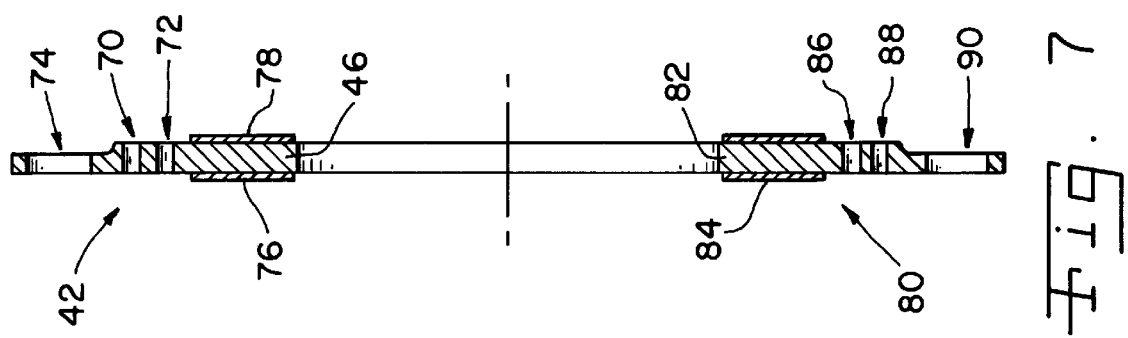
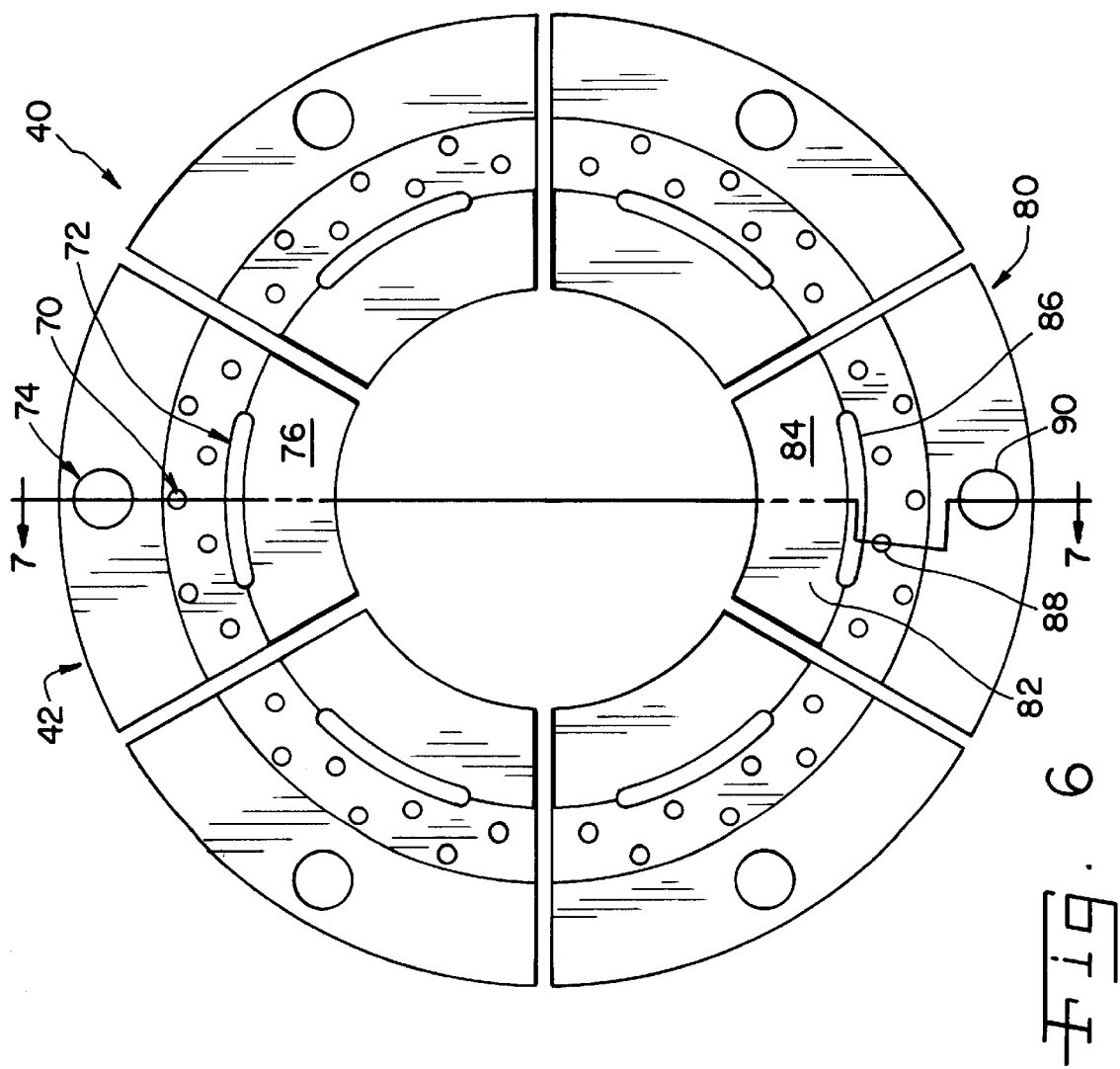

6,006,660

SEGMENTED DRIVE DISK FOR A MECHANICAL PRESS

BACKGROUND OF THE INVENTION

1. Field of the Invention

The present invention relates to a mechanical press and, more particularly, to a drive disk assembly that is segmented in order to provide the ability to remove individual portions of the drive disk for replacement.

2. Description of the Related Art

The typical mechanical press includes a bed that is mounted to a platform or the floor of a shop, a vertically spaced crown portion in which the drive assembly for the slide is contained, and one or more uprights rigidly connecting the bed and crown and maintaining the bed and crown in vertically spaced relationship. The crown houses the drive assembly, which typically comprises a crankshaft having a plurality of eccentrics thereon and connecting rods coupled to the crankshaft eccentrics at their upper ends and to the slide at their lower ends. The slide is mounted within the uprights for reciprocating motion and is adapted to have the upper half of the die set mounted to it with the other half mounted to the bolster, which is connected to the bed.

At one end of the crankshaft or on a top or side mounted driveshaft is conventionally mounted a flywheel and clutch assembly wherein the flywheel is connected by a belt to the output pulley of a motor such that when the motor is energized, the massive flywheel rotates continuously. When the clutch is energized, the rotary motion of the flywheel is transmitted to the crankshaft, which causes the connecting rods to undergo rotary-oscillatory motion that is transmitted to the slide assembly by means of a wrist pin, for example, so that such motion is converted to rectilinear reciprocating motion of the slide. The connecting rods may be connected directly to the slide or connected by means of pistons, which in turn are slidably received within cylinders connected to the crown.

In one conventional configuration, a clutch flex plate is attached to the flywheel and includes a drive disk attached thereto. A driven disk, including a combination brake/clutch assembly, is attached to the crankshaft. The brake/clutch assembly may be selectively energized to engage the driven disk with the drive disk of the flywheel arrangement, thereby transferring rotational energy to the crankshaft, or it may be de-activated to retard and eventually brake the crankshaft movement.

An adverse operating condition experienced by such disk arrangements involves the tendency of the drive disk, which is connected to the flywheel or clutch flex plate, to heat up due to frictional contact of the drive disk with the driven disk. This frictional engagement causes the drive disk to thermally expand during the operating cycle. This expansion, if of sufficient magnitude and duration, may cause the drive disk to grow radially and displace axially, in either or both of the axial directions, into contact with one of the clutch facings of the driven disk or clutch sleeve. The contact formed by the axial movement of the drive disk under such conditions is called thermally-induced axial closeout. This unintended contact results in excessive glazing and friction between the clutch facing and drive disk, thereby causing burnout of the clutch facing and/or excessive wear. Furthermore, axial closeout prevents the drive disk from fully disengaging from the clutch facings of the driven disk.

SUMMARY OF THE INVENTION

According to the present invention there is provided a press machine including a drive disk rotatably driven by the flywheel and segmented into a plurality of discrete rotary drive disk segments that may be individually removed if necessary. Each drive disk segment preferably includes a slot formed therethrough that acts as an insulator by establishing a thermal barrier preventing heat flow into the thermally-sensitive areas of the assembly.

The invention, in one form thereof, is directed to a press comprising a frame structure with a crown and a bed; a slide guided by the frame structure for reciprocating movement in opposed relation to the bed; a drive mechanism attached to the frame structure; a flywheel rotatably driven by the drive mechanism; a drive disk drivingly coupled to the flywheel for rotation therewith, the drive disk comprising at least two drive disk segments; a crankshaft rotatably disposed within the crown and in driving connection with the slide; and a driven disk coupled to the crankshaft for selective engagement with the drive disk. Alternatively, the clutch and flywheel may be mounted on a driveshaft connected to the crankshaft by gears and pinions, as on a geared press.

At least one of the at least two drive disk segments further includes at least one slot formed therethrough. The at least two drive disk segments include, in one form thereof, six drive disk segments each preferably extending through a substantially 60 degree arc. The drive disk is drivingly coupled to the flywheel, at least in part, at a mid-region of at least one of the six drive disk segments.

The invention comprises, in another form thereof, an apparatus for use in a press machine, the press machine including a flywheel and a crankshaft. The apparatus comprises a drive disk drivingly coupled to the flywheel for rotation therewith, the drive disk comprising a plurality of drive disk segments; and a means coupled to the crankshaft for selective engagement with the drive disk. At least one of the plurality of drive disk segments further includes at least one slot formed therethrough. The plurality of drive disk segments includes, in one form thereof, six drive disk segments each extending through a substantially 60 degree arc.

The invention comprises, in another form thereof, a press machine comprising a frame structure with a crown and a bed; a slide guided by the frame structure for reciprocating movement in opposed relation to the bed; a drive mechanism attached to the frame structure; a flywheel rotatably driven by the drive mechanism; a drive disk drivingly coupled to the flywheel for rotation therewith, the drive disk being segmented into at least two rotary drive disk segments; a crankshaft rotatably disposed within the crown and in driving connection with the slide; and a driven disk coupled to the crankshaft for selective engagement with the drive disk. At least one of the at least two rotary drive disk segments further includes at least one slot formed therethrough. The at least two rotary drive disk segments include, in one form thereof, six rotary drive disk segments each extending through a substantially 60 degree arc.

The invention comprises, in yet another form thereof, an apparatus for transferring rotary motion from a first rotary device to a second rotary device. The apparatus comprises a drive disk drivingly coupled to the first rotary device for rotation therewith, the drive disk being segmented into at least two rotary drive disk segments; and a means coupled to the second rotary device for selective engagement with the drive disk. At least one of the at least two rotary drive disk segments further includes at least one slot formed therethrough.

One advantage of the present invention is that the segmental arrangement for the drive disk promotes ease of manufacturability and maintenance since a press malfunction or substandard performance level attributable to the drive disk may be eliminated by simply removing the affected one of the individual drive disk segments.

Another advantage of the present invention is that the segmental arrangement for the drive disk permits renewal of the facing material without having to disassemble the entire clutch and drive disk assembly. Such disassembly of a clutch and drive disk assembly is experienced in terms of time, partially down time for the machine.

A further advantage of the present invention is that the slotted regions formed in the drive disk segments create a thermal barrier acting as an insulator to redirect and/or divert generated heat to areas of the drive disk that are relatively insensitive to heat exposure.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is an upper planar view of a drive disk assembly according to one embodiment of the present invention as shown in assembled relation to its adjoining press machine components;

FIG. 3 is a lateral cross-sectional view of the assembled arrangement of FIG. 2 taken along line 3—3 therein, illustrating in fragmentary sectional view the connection of the drive disk assembly to the press machine flywheel and to the adjoining press components;

FIG. 4 is an upper planar view of an individual one of the drive disk segments from the drive disk assembly of FIG. 2;

FIG. 5 is a lateral cross-sectional view of the single drive disk segment of FIG. 4 taken along line 5—5 therein;

FIG. 6 is an upper planar view of the drive disk assembly of FIG. 2 as shown isolated from the adjoining press machine components and arranged in its assembly orientation; and FIG. 7 is a lateral cross-sectional view of the drive disk assembly of FIG. 6 taken along line 7—7 therein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
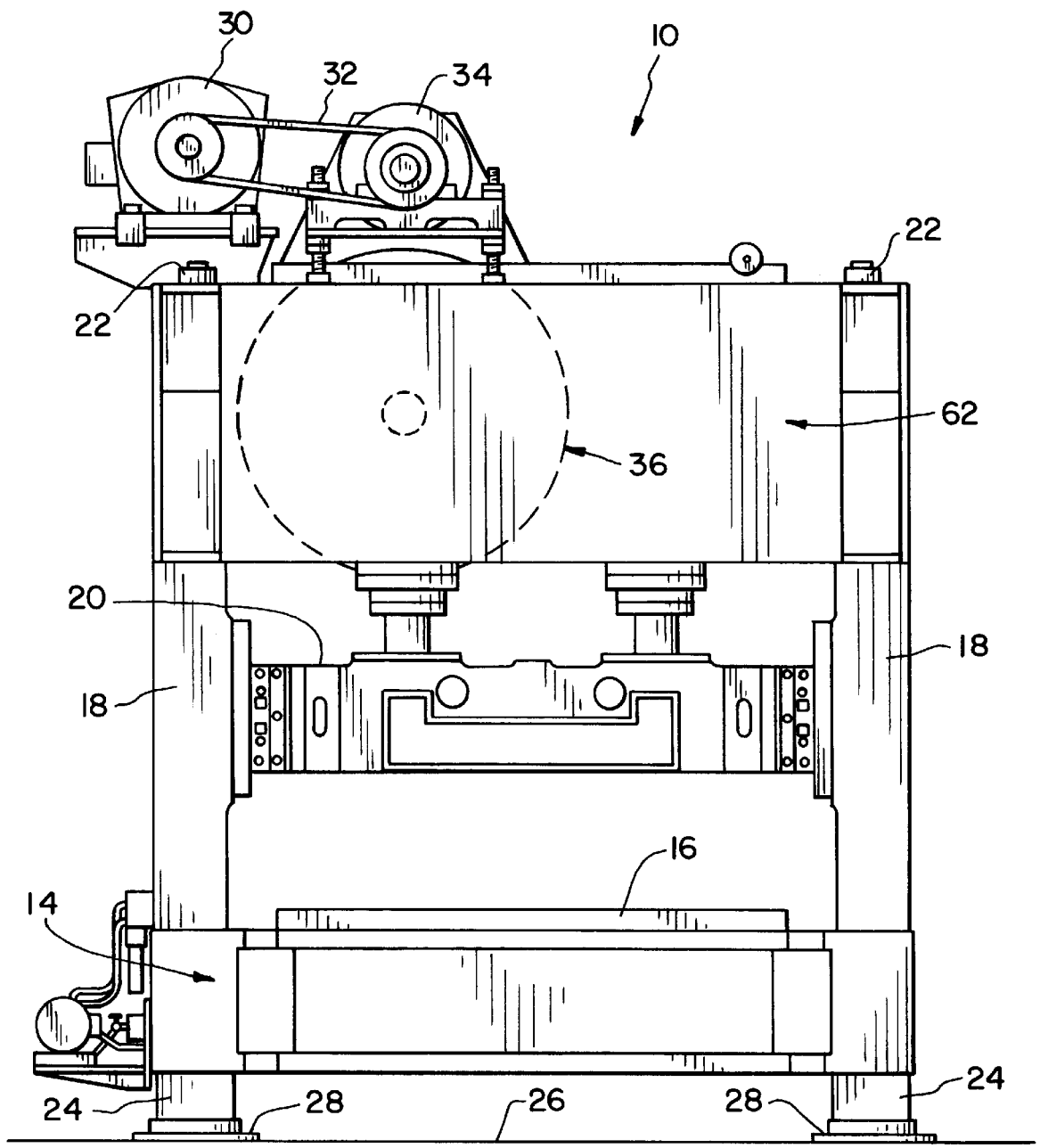
FIG. 1 is an elevational front view of a press machine incorporating the present invention in one illustration form thereof.

Referring now to the drawings and particularly to FIG. 1, there is shown a mechanical press 10 including a crown portion 12, a bed portion 14 having a bolster assembly 16 connected thereto, and uprights 18 connecting crown portion 12 with bed portion 14. Uprights 18 are connected to or integral with the underside of crown 12 and the upper side of bed 14. A slide 20 is positioned between uprights 18 for reciprocating movement. Tie rods (not shown), which extend through crown 12, uprights 18 and bed portion 14, are attached at each end with tie rod nuts 22. Leg members 24 are formed as an extension of bed 14 and are generally mounted on shop floor 26 by means of shock absorbing pads 28. A drive press motor 30, which is part of the drive mechanism, is attached by means of a belt 32 to an auxiliary flywheel 34 attached to crown 12. Auxiliary flywheel 34 is connected by means of a belt (not shown) to the main flywheel of the combination clutch/brake assembly, depicted generally at 36.

FIGS. 2 and 3 show respectively a drive disk assembly 40 according to one embodiment of the present invention and a cross-sectional view thereof taken along line 3—3 in the indicated direction. The illustrated drive disk assembly 40 is shown in assembled relation to its adjoining press machine component (discussed hereinafter) and includes six discrete drive disk portions or segments 42 arranged in a substantially circular orientation preferably about a common rotational axis identified at 44 and forming, as an integrated unit, a drive disk structure whose constituent parts 42 are provided in the form of wedge-like elements the integral assembly of disk segments 42 acts collectively and cooperatively as a device suitable for transferring rotational motion from one rotary component (e.g., flywheel) to another such component (e.g., crankshaft). It is this illustrated segmentation of the drive disk unit that constitutes the principal feature of the present invention.

The drive disk segments 42 are preferably assembled as shown in a non-contiguous manner (i.e., not in abutting relationship) to provide a venting passage at the discontinuity (i.e., split line) between adjacent drive disk segments and to provide a growth margin, enabling a certain amount of thermally induced expansion to occur without causing interference. However, this should not serve as a limitation as it should be apparent that the drive disk segments 42 may be differently arranged to establish alternative boundary relationships between adjoining drive disk segments. Additionally, any degree of annularity associated with the drive disk assembly 40 is merely illustrative and should not be considered as a limitation herein since the individual drive disk segments 42 may be constructed having any suitable dimensions that may not necessarily produce what is conventionally regarded as an annular shape. The illustrated drive disk segment 42, which for purposes of description herein is representative of the other disk segments shown throughout the drawings, includes an inner radial band or section 46, an outer radial band or section 48, and a mid-band or section 50 interposed between and radially bounded by sections 46 and 48.

Inner section 46 defines an inner radius of drive disk segment 42 relative to axis 44.

The preferred form of the individual drive disk segments 42 is concerned with providing, in one aspect thereof, a structure having the ability to expand radially in response to thermal influences while minimizing the possibility of axial growth that may cause shifting of the drive assembly. To this end, the shape and geometry of the disk segments 42 disclosed herein should be understood as encompassing any configuration that takes into account these thermal-related effects, with the eventual design being tailored to optimize criteria such as drive disk performance, heat design being tailored to optimize criteria such as drive disk performance, heat generation, thermal-induced growth, and positional stability of the drive disk.

Drive disk 40 is integrally coupled to flywheel 52 for driving rotation therewith using a flex clutch plate or disc 54 and an annular-shaped ring clamp 56. Flex clutch plate 54 is known in the art to comprise a plurality of thin, spaced-apart metal segments that, in use, are gradually and resiliently pressed into engagement with other clutch members, permitting a certain amount of axial displacement of drive disk 40 that becomes necessary during clutch engagement. Drive disk 40 is mounted to ring clamp 56 at the respective mid-sections 50 of its drive disk segments 42 using the circular bolting arrangement shown generally at 58, in which each drive disk segment 42 is provided with a plurality of bolt-receiving holes formed in mid-section 50 thereof to facilitate the mounting procedure. Bolts 60 and 62 are representative ones of such mounting bolts. Flex disk 54 is interposed between drive disk 40 and ring clamp 56 in a fixed rotary orientation therewith and is fixedly attached to flywheel 52 at a circumferential periphery thereof using a series of spaced-apart bolts of which bolts 64 and 66 are representative ones thereof. Accordingly, the integrally joined components of segmented drive disk 40, flex disk 54, and ring clamp 56 move in driving response to and in concurrent tandem rotation with flywheel 52.

The individual drive disk segments 42 are preferably of uniform shape, although other size and geometry combinations are encompassed herein consistent with the functionality proper to a drive disk. Additionally, although six drive disk segments are shown herein in which each such segment preferably extends through a substantially 60 degree arc, the drive disk assembly 40 of the present invention may include any arrangement of at least two drive disk segments properly organized into an integral drive disk unit. Moreover, the relative planarity of the drive disk segments 42 illustrated herein should not be considered as a limitation thereof since any suitable contour may be used.

FIG. 4 shows an individual one of the drive disk segments 42 of the illustrated drive disk assembly 40 in the form of a discrete detached unit, with FIG. 5 depicting a cross-sectional view thereof taken along line 5—5 in the indicated direction. The illustrated drive disk segment 42 includes at its mid-section 50 a plurality of spaced-apart bolt-receiving holes 70 sufficient: in number, arrangement, and dimensions to enable a suitable mounting of segment 42 to flywheel 52, i.e., via ring clamp 56. There is further provided a slot 72 generally located at the interface between inner segment section 46 and mid-section 50 and preferably formed, at least in part, through drive segment 42. Slot 72 extends illustratively in a radial manner through a generally arc-shaped path. Outer segment section 48 may include an arbitrarily sized and positioned bore hole(s) 74 formed therethrough to facilitate backside access to components located rearwardly of drive disk 40. Mounted to the outward-facing and inward-facing surfaces of inner section 46 of drive disk segment 42 are frictional pads 76 and 78, respectively, which are suitable for respective engagement with the driven disk (not shown) of the brake/clutch assembly and a clutch sleeve (not shown) coupled to the crankshaft, for example, during clutch activation. The frictional pads 76 and 78 are attached to drive disk segment 42 using conventional bonding techniques.

FIG. 6 shows drive disk assembly 40 in a fully integrated arrangement consistent with its as-installed press machine configuration, while FIG. 7 depicts a cross-sectional view thereof taken along line 7—7 in the indicated direction. FIG. 7, in particular, shows the orientation of two drive disk segments 42 and 80 disposed in opposing relation to one another within drive disk assembly 40.

In operation, press drive motor 30 will spin auxiliary flywheel 34 and main flywheel 36 up to their press operating speed. In response to an activation event (e.g., the application of hydraulic fluid to actuating pistons), the driven disk of the clutch/brake combination and its associated clutch facings are caused to move into contact with drive disk 40 at its frictional pad areas. In particular, the contact surface of the driven disk will engage the drive disk segments 42 at the frictional pads 76 bonded to inner segment sections 46 at its forward side, while the contact surface of the clutch sleeve will engage the drive disk segments 42 at the frictional pads 78 bonded to inner segment sections 46 at is rearward side. The flywheel is now engaged to transfer rotational energy to the driven disk and clutch sleeve, which jointly communicate it to the crankshaft.

As noted above, this press activity involving frictional engagement between conventional rotary devices present certain problems due to the sustained thermal energy that is generated. This invention, as explained below, permits thermally-induced radial growth without forcing axial close-out essentially minimizing the effects of thermal growth on axial motion of the drive disk.

In accordance with one aspect of the present invention, the individual drive disk segments 42 are not subject to the same growth constraints experienced by continuous-circle disk structures since their wedge-like shape permits the disk segments to be characterized for purposes of thermal response analysis as a relatively straight beam, which possesses a distinctly different growth dynamic as compared to a circular structure. In particular, as with an elongate beam, the segment elements 42 support growth in the radial direction (lengthwise direction for a beam) without deleterious growth in the axial direction (crosswise direction for a beam). Consequently, the individual disk segments 42 can grow thermally without causing the flex disks to shift axially.

In accordance with another aspect of the present invention, the formation of at least one slot 72 through drive disk segment 42 provides a capacity for accommodating radial growth in response to thermal conditions prevailing within the drive disk 40. Slot 72 supports radial growth in both directions into the open space defined by its inner wall surfaces. Another advantage attained by slot 72 is its functioning as an effective heat barrier or insulator in which the air volume within slot 72 acts to trap heat therein (which may then lead to harmless radial growth in the slot) and thereby prevent heat from reaching the thermally-sensitive areas of the drive disk assembly 40, namely the attachment location of the drive disk segment (i.e., bolt region at the central part of the segment) which has very limited tolerance for growth. Slot 72, in general, provides a mechanism by which heat may be forced or diverted to other areas of the drive disk where appropriate heat management is possible, thereby guiding heat away from the sensitive regions. Another approach to keeping heat out of the bolt joint area involves bonding the friction material directly to the drive disk segment. The friction material as so arranged acts like an insulator, forcing heat to go into other parts of the clutch mechanism such as the clutch sleeve and driven disk. Excessive heat build-up in these parts is alleviated by adding axial cooling vents or slots into the clutch sleeve and adding radial cooling slots into the driver disk. Air can be vented through these cooling passages to transport away heat.

In accordance with another respect of the present invention, the attachment of drive disk 40 to the flywheel at the mid-section of its disk segments 42 creates advantages for the bolt joint area in terms of heat protection. The outer segment section acts as a suitable heat sink enabling heat to be drawn away or transferred from the bolt joint area and introduced into the outer segment section having less sensitivity to thermal exposure. Heat management is therefore provided to the sensitive area (i.e., bolt joint area) at both sides thereof.

In accordance with another aspect of the present invention, the segmented drive disk 40 permits replacement of the frictional facing material without disassembling the entire clutch and drive disk 40. Rather, only the particular drive disk segment of interest must be removed from the assembly to replace its corresponding friction pad. This individualized approach is also used when it becomes necessary to service one of the drive disk segments 42, whereby each drive disk segment 42 may be removed independently of the others, which remain firmly bolted into place to keep the parts in line. In the prior art, by contrast, maintenance to the continuous drive disk involves replacing it in its entirety. The manufacturability of the drive disk assembly also becomes easier with the disk augmentation disclosed herein.

The drive disk assembly disclosed herein is not limited in its applicability to any particular clutch configuration or press machine type but may be incorporated into any other suitable arrangement. Furthermore, the drive disk/clutch assembly maybe located on the press drive shaft as opposed to the press crankshaft. Additionally, the drive disk assembly can be employed in machines other than mechanical presses.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press, comprising:

a frame structure with a crown and a bed;

a slide guided by the frame structure for reciprocating movement in opposed relation to said bed;

a drive mechanism attached to said frame structure;

a flywheel rotatably driven by said drive mechanism;

a drive disk drivingly coupled to said flywheel for rotation therewith, said drive disk comprising at least two drive disk segments;

a crankshaft rotatably disposed within said crown and in driving connection with said slide; and a driven disk coupled to said crankshaft for selective engagement with said drive disk.

2. The press as recited in claim 1, wherein at least one of said at least two drive disk segments further includes:

at least one slot formed therein.

3. The press as recited in claim 1, wherein at least one of said at least two drive disk segments further includes:

at least one slot formed therethrough.

4. The press as recited in claim 1, wherein said at least two drive disk segments include six drive disk segments.

5. The press as recited in claim 4, wherein each one of said six drive disk segments extends through a substantially 60 degree arc.

6. The press as recited in claim 5, wherein at least one of said six drive disk segments further includes:

at least one slot formed therethrough.

7. The press as recited in claim 6, wherein the at least one slot formed through the at least one of said six drive disk segments supports radial growth.

8. The press as recited in claim 6, wherein said drive disk is drivingly coupled to said flywheel, at least in part, at a mid-region of at least one of said six drive disk segments.

9. A press machine, comprising:

a frame structure with a crown and a bed;

a slide guided by the frame structure for reciprocating movement in opposed relation to said bed;

a drive mechanism attached to said frame structure;

a flywheel rotatably driven by said drive mechanism;

a drive disk drivingly coupled to said flywheel for rotation therewith, said drive disk being segmented into at least two rotary drive disk segments;

a crankshaft rotatably disposed within said crown and in driving connection with said slide; and a driven disk coupled to said crankshaft for selective engagement with said drive disk.

10. The press machine as recited in claim 9, wherein at least one of said at least two drive disk rotary segments further includes:

at least one slot formed therethrough.

11. The press machine as recited in claim 9, wherein said at least two drive disk rotary segments include six drive disk rotary segments.

12. The press machine as recited in claim 11, wherein each one of said six drive disk rotary segments extends through a substantially 60 degree arc.

13. The press machine as recited in claim 12, wherein at least one of said six drive disk rotary segments further includes:

at least one slot formed therethrough.

14. The press machine as recited in claim 13, wherein the at least one slot formed through the at least one of said six drive disk rotary segments supports radial growth.

15. The press machine as recited in claim 14, wherein said drive disk is drivingly coupled to said flywheel, at least in part, at a mid-region of at least one of said six drive disk rotary segments.

16. A press, comprising:

a frame structure with a crown and a bed;

a slide guided by the frame structure for reciprocating movement in opposed relation to said bed;

a drive mechanism attached to said frame structure;

a flywheel rotatably driven by said drive mechanism;

a drive disk drivingly coupled to said flywheel for rotation therewith, said drive disk comprising at least two drive disk segments;

a crankshaft rotatably disposed within said crown and in driving connection with said slide;

a driveshaft connected by gearing to said crankshaft; and a driven disk coupled to said driveshaft for selective engagement with said drive disk.

* * * * *